United States Patent [19]

Zweekly

[11] 4,363,576

[45] Dec. 14, 1982

[54] SLOTTING CUTTER

[75] Inventor: Raymond T. Zweekly, Royal Oak, Mich.

[73] Assignee: The Valeron Corporation, Troy, Mich.

[21] Appl. No.: 249,025

[22] Filed: Mar. 30, 1981

Related U.S. Application Data

[63] Continuation-in-part of Ser. No. 182,224, Aug. 28, 1980.

[51] Int. Cl.³ .............................................. B26D 1/12
[52] U.S. Cl. ...................................... 407/50; 83/845; 407/109
[58] Field of Search ....................... 407/40, 41, 47, 49, 407/50, 93, 109; 83/838, 839, 845

[56] References Cited

U.S. PATENT DOCUMENTS

| 207,003 | 8/1878 | Berry | 83/845 |
| 341,187 | 5/1886 | Timmons | 83/845 |
| 2,982,009 | 5/1961 | Swenson | 407/50 |
| 4,257,302 | 3/1981 | Heimbrand | 83/839 |

FOREIGN PATENT DOCUMENTS

| 129868 | 2/1978 | Fed. Rep. of Germany | 407/50 |
| 1393181 | 2/1965 | France | 83/838 |
| 422295 | 4/1967 | Switzerland | 83/839 |

*Primary Examiner*—Leonidas Vlachos
*Attorney, Agent, or Firm*—Gordon K. Harris, Jr.

[57] ABSTRACT

Improved apparatus is disclosed for positively locating and retaining disposable inserts of a slotting cutter. The apparatus is arranged such that inserts normally used in non-rotating cut-off, parting or grooving tools can be mounted in a relatively narrow substantially circular rotating cutter body, thereby permitting narrower slot formations than heretofore possible with such tools.

16 Claims, 4 Drawing Figures

SLOTTING CUTTER

RELATED APPLICATION

This application is a continuation-in-part of my prior U.S. Patent Application Ser. No. 6-182224, filed Aug. 28, 1980 and assigned to the same assignee as the instant application.

BACKGROUND OF THE INVENTION

1. Field of the Invention

The invention relates generally to cutting element, or insert, retention or clamping arrangements. More specifically, the invention pertains to apparatus for locating and clamping each of a plurality of metal cutting inserts in a slotting cutter.

2. Description of the Prior Art

For machining slots ov various widths in workpieces, prior art cutters are known having a disk-like body with disposable cutting inserts protruding radially from the disc periphery. For efficient machining, such inserts must be solidly and accurately supported. This requirement has heretofore led to use of relatively bulky insert wedging elements, or inserts of relatively complex shape, along with a minimum cutter body width capable of supporting the prior art insert mounting arrangements. This minimum cutter body width, in turn, defines the minimum width slot capable of being formed by such rotating slotting cutters. For slots narrower than such minimum, integral high speed steel saw blades or cutters utilizing brazed cutting tips had to be used.

Examples of pertinent prior art cutters of the type described are shown in U.S. pat. Nos. 867,275-Hunter, 1,618,782-Rottler, 1,700,333-Pond, 3,590,893-Burkiewicz, and 3,887,975-Sorice et al.

The Hunter, Rottler, and Burkiewicz disclosures teach insert clamping via flexible portions of the cutter body. Such flexibility is allegedly obtained by providing additional saw cuts or slit-like apertures in the body positioned between cutting blade pockets.

The Pond and Sorice et al. patents set forth arrangements utilizing camming members which bear against appropriately shaped portions of the cutting inserts to achieve clamping. In such arrangements, the cutting forces exerted on the insert are transmitted directly onto the cam surfaces, which can lead to damaging cam wear. This condition also necessitates a greater body thickness surrounding the camming member. An additional disadvantage of such an approach arises from the necessity of fashioning inserts with the requisite complicated surfaces which must cooperate with the camming member.

In my above-identified prior application, relatively narrow cut-off and grooving inserts are retained in a narrow insert support blade in a novel manner. By further investigation of the approach disclosed in the prior application, I have discovered a novel approach to insert retention in a rotating slotting cutter having a body width which may be as narrow as the support blades used with cut-off inserts in single point, non-rotating cut-off and grooving tools.

SUMMARY OF THE INVENTION

It is therefore an object of this invention to provide insert retention in a slotting cutter enabling positive location and rigid clamping of each insert in cutter bodies that may virtually be as narrow as a conventional cut-off or grooving tool insert cutting edge while avoiding the above deficiencies of prior art slotting cutter designs.

In accordance with such an object, a slotting cutter includes a plurality of disposable cutting inserts placed in a corresponding plurality of pockets circumferentially spaced about the periphery of the disc-shaped cutter body, each insert having cutting edges of length substantially equal to the width of the desired slot to be cut. In addition to a portion of an insert, each pocket houses a flexible, substantially planar clamping element lying within the plane of cutter body rotation. Adjacent to each pocket is disposed actuating means rotatable in the plane of cutter body rotation, positioned such that, upon rotative movement thereof, the actuating means causes the clamping element to secure the insert in operative cutting position.

DRAWING

The objects and features of the invention will become apparent from a reading of a detailed description of an embodiment of the invention taken in conjunction with the drawing in which.

DETAILED DESCRIPTION

Figure 1:
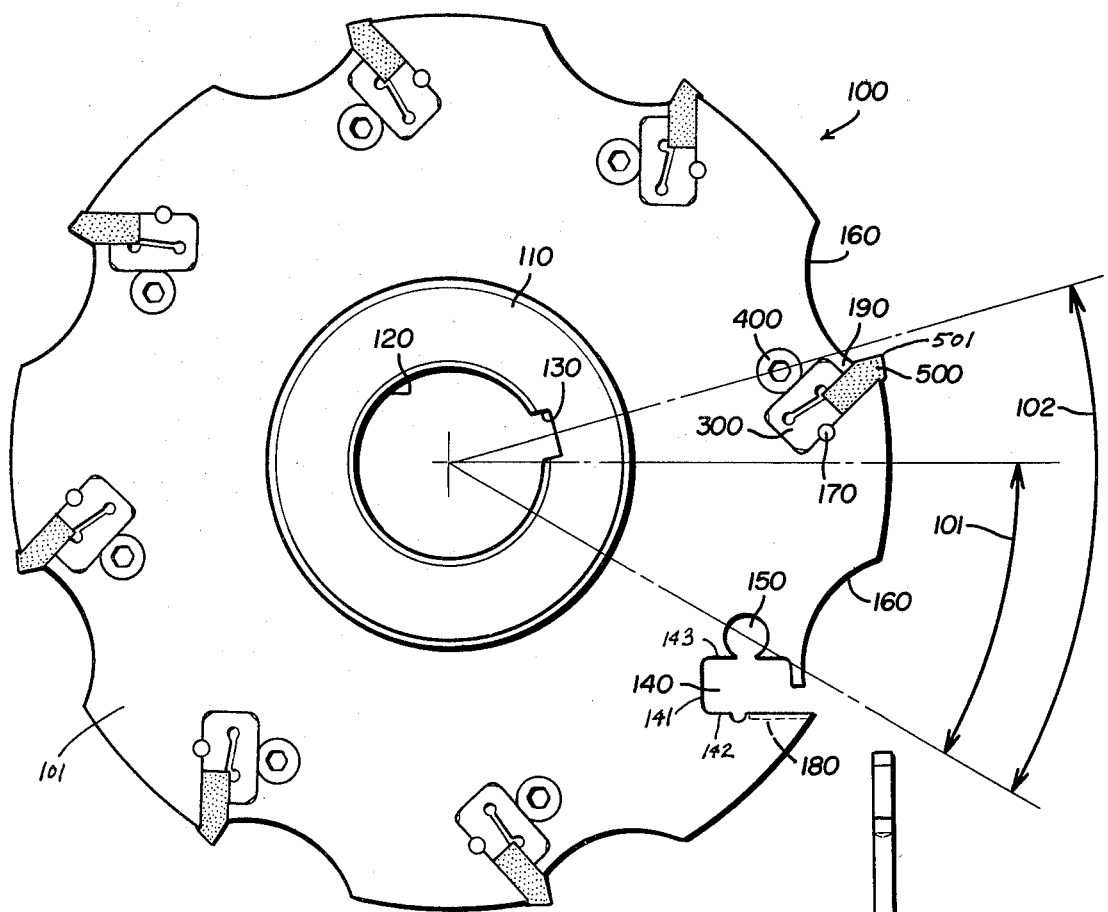
FIG. 1 is a plan view taken along the axis of rotation of a slotting cutter arranged in accordance with the principles of the invention.

With reference to FIGS. 1-4 of the drawing, the same reference numerals are used for the same component or portion of the apparatus depicted in the various figures.

Figure 2:
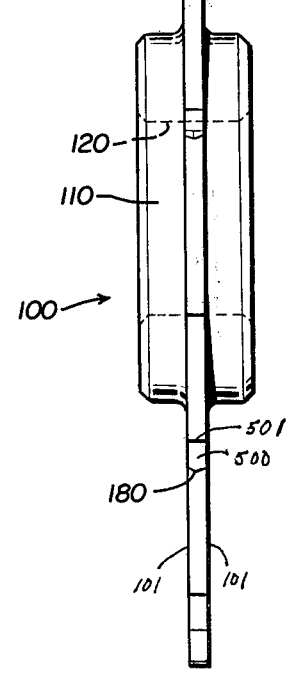
FIG. 2 is a view of the cutter of FIG. 1 taken normal to the axis of rotation of the cutter body.

Referring to FIGS. 1 and 2, a slotting cutter capable of using cut-off and grooving tool inserts is set forth. One such insert that may be used with the disclosed embodiment is described in more detail in the above referenced prior application Serial Number 6-182224, which is hereby incorporated by reference. As seen from FIGS. 1 and 2, each insert 500 has a cutting edge 501 extending substantially parallel to the cutter body axis of rotation for a distance at least as wide as the width of the cutter body.

Slotting cutter 100 comprises a disc-shaped body portion of relatively narrow axial thickness defined by first and second lateral surfaces 101. The outer disc-shaped portion terminates centrally of the body in an enlarged hub region 110, in which is placed an axially centered bore 120 for receipt of a support shaft of a driving machine spindle (not shown). Rotative motion is imparted to the cutter via a drive key (also not shown) which mates with drive keyway 130.

Peripherally spaced at substantially equal angular positions about the cutter body are substantially rectangular recesses, or clamp and insert receiving pockets, 140, each having substantially parallel top and bottom surfaces, 143 and 142, respectively, joined by a rear surface 141, and opening radially outwardly for mating receipt of an insert 500. The radially outermost portion of each pocket is partially terminated by a lip portion 190 of cutter body material. Each surface 41, 42, 43 extends axially from one lateral surface 101 to the other.

A portion 180 of bottom surface 142 of each pocket is generally V-shaped to conform to the bottom surface of each insert 500.

Figure 3:
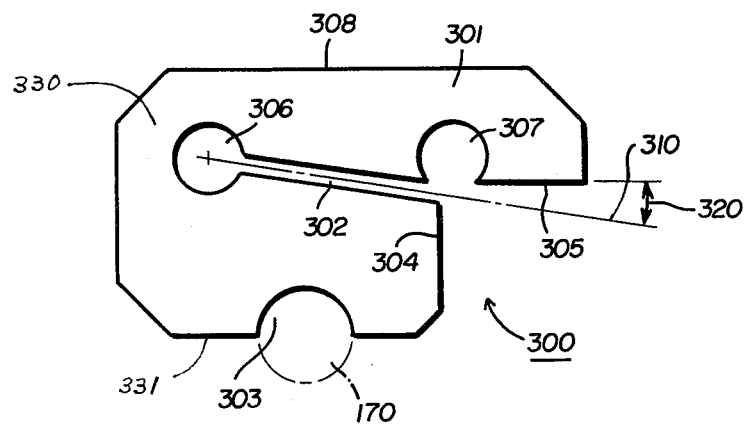
FIG. 3 is a more detailed view of the insert retention or clamping apparatus utilized in each insert retention pocket of the cutter of FIG. 1.

Referring to FIG. 1 in conjunction with FIG. 3, in addition to housing an insert 500, each pocket 140 additionally contains a substantially planar insert retention or clamping blade 300, having a rear surface 332 abutting the rear pocket surface 141, a top surface 308 abutting the top pocket surface 143, a clamping surface 305 in overhanging engagement with a portion of a top surface of an insert 500, a bottom surface 331 abutting a portion of bottom pocket surface 142 radially inward from insert 500, and an insert positioning surface 304 for providing a positive stop for a corresponding rear surface of insert 500. As shown, each blade 300 lies in the plane of cutter body rotation between lateral surfaces 101.

Each retention element 300 further includes an aperture in the form of a sawcut or slit 302 extending from an opening at the juncture of surfaces 304 and 305 and extending radially inwardly (when viewed as mounted in a cutter body pocket) towards rear surface 332 and terminating, for example, at an undercut 306. To assist in achieving proper insert seating location, undercut 307 is provided at surface 308. Sawcut 302 is positioned such that a moveable clamping portion 301 of blade 300 is provided, capable of flexing movement about blade portion 330. In a preferred form, sawcut 302 forms a relatively small angle 320 with the surface 308, on the order of, for example, eight degrees.

Bottom surface 331 is additionally provided with substantially semicircular tack hole or depression 303 at a position where blade 300 is to be tack-welded to cutter body 100. This tack weld is shown at 170 of FIG. 1.

Figure 4:
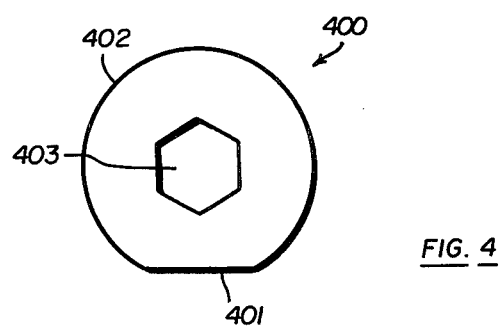
FIG. 4 is an axial view of a camming member utilized in conjunction with the inssert retention apparatus depicted in the cutter of FIG. 1.

Referring now to FIGS. 1 and 4, mounted adjacent to each top pocket surface 143 in a mating cavity 150 is a clamp actuator or camming member 400, rotatable in its mating cavity about an axis substantially parallel to the axis of cutter body rotation and having a plane of rotation identical to the cutter body plane of rotation. As seen from FIG. 4, each camming member 400 has a circular peripheral portion 402 subtended in a cord-like fashion by flattened peripheral portion 401. Additionally, each member 400 is provided on at least one lateral face with a hexagonal socket 403 for engagement with a standard hexagonal wrench for imparting rotational movement to the camming member. Each camming member is substantially permanently mounted in its respective cavity 150 by peening the lateral surfaces 101 of the cutter body around the periphery of cavity 150.

As shown in FIG. 1, each projecting cutting insert 500 is preceded in a direction of cutter body rotation by a suitably shaped chip gullet 160.

In a non-clamping condition, camming member 400 has its flattened portion 401 positioned in cavity 150 such that portion 401 is parallel and coextensive to top pocket surface 143. Under this condition, an insert 500 can be slideably inserted or removed at the pocket opening. On insertion, the insert slides back until a rear insert surface abuts insert locating surface 304 of blade 300 to positively position the radial extent of insert cutting edge 501. Upon rotation in either direction of camming member 400 in the cutter body plane of rotation, camming member surface 402 will urge moveable clamping portion 301 of blade 300 in a direction tending to clamp insert 500 between blade clamping surface 305 and bottom pocket surface portion 180.

Hence each insert 500 may be positively positioned and clamped via a means no wider than the narrowest portion of cutter body 100. Therefore, slots of much narrower width may be formed with slotting cutters of this invention than could heretofore be formed with prior art slotting cutters utilizing disposably mounted cutting inserts. Slots as narrow as on the order of ⅛" have been fashioned with cutters designed in accordance with the principles of the invention. One typical range of widths that appears commercially feasible is on the order of ⅛" to 3/16". Such dimensions are, of course, presented for the sake of example only and are not intended to place implied limitations on the scope of this invention. It will be apparent to those skilled in the relevant cutting tool art, that the minimum width of slots formed by use of this invention is limited only by the width of the cutting edge of the inserts employed, and not by the size of the novel insert clamping apparatus set forth hereinabove.

It should be noted that the invention described herein has been illustrated with reference to a particular embodiment. It is to be understood that many details used to facilitate the description of such a particular embodiment are chosen for convenience only and without limitation on the scope of the invention. Many other embodiments may be devised by those skilled in the art without departing from the scope and spirit of the invention. For example, the planar insert clamping blade 300 could be formed as an integral portion of the cutter body, by milling out appropriately positioned slits to define a flexible clamping portion of body material positioned between each camming member snd one surface of a corresponding insert pocket. Accordingly, the invention is intended to be limited only by the scope and spirit of the appended claims.

I claim:

1. A slotting cutter comprising:
a substantially disc shaped body having first and second lateral surfaces substantially parallel to the plane of rotation and substantially perpendicular to the axis of rotation of the body;
a plurality of pockets spaced about the periphery of the body and extending from one lateral surface to the other, each pocket adapted for receipt of a cutting insert and comprising a substantially rectangular cavity having parallel bottom and top surfaces and a rear surface, at least a portion of the bottom surface shaped for mating receipt of a bottom surface of the cutting insert;
insert retention means including a clamping portion moveable in the plane of body rotation by flexing into clamping engagement with the insert, each retention means further comprising a substantially planar member positioned in a corresponding pocket and having an insert positioning surface substantially perpendicular to the bottom pocket surface and abutting a rear surface of the insert, a bottom surface abutting a bottom pocket surface portion rearward of the insert, a rear surface abutting the rear pocket surface, a top surface abutting the top pocket surface, and a clamping surface engaging a top surface of the insert; and
actuating means positioned for rotation within the plane of body rotation, operative in at least a first rotative position to urge the clamping portion into engagement with the insert.

2. A cutter as set forth in claim 1 wherein the actuating means comprises a camming member having a first peripheral surface of substantially circular shape and a flattened portion subtending the first peripheral surface, the camming member being contained in a mating cavity extending between corresponding planes of the first and second lateral surfaces of the body, with the rotational axis of the camming member being substantially parallel to the axis of rotaion of the cutter body.

3. A cutter as set forth in claim 2 wherein the insert retention means further comprises:
an aperture in the planar member positioned so as to provide the movable clamping portion of the insert retention means, the clamping portion being bounded by the top surface of the insert retention means and the clamping surface of the insert retention means.

4. A cutter as set forth in claim 3 wherein the camming member is positioned such that the flatted portion of the camming member abuts the movable clamping portion of the insert retention means in a non-clamping position and whrein the camming member bears against the clamping portion of the insert retention means when rotated from the non-clamping position in either of two rotative directions about the axis of the camming member.

5. A cutter as set forth in claim 4 wherein the flatted portion of the camming member abuts the top surface of the insert retention means in the non-clamping position.

6. A cutter as set forth in claim 5 wherein the mating cavity containing the camming member extends through the cutter body at a position adjacent to a corresponding pocket.

7. A cutter as set forth in claim 6 wherein a cutting edge of each insert extends substantially parallel to the axis of rotation of the cutter body for a distance at least as wide as the distance separating the first and second lateral surfaces of the disc shaped body.

8. A cutter as set forth in claim 6 wherein the insert retention means is tack welded at the abutment of the bottom surface of the pocket with the bottom surface of the insert retention means.

9. A cutter as set forth in claim 6 wherein a lip portion of the cutter body abuts a portion of the top surface of the insert adjacent to and radially outward from the clamping surface of the insert retention means.

10. A cutter as set forth in claim 7 wherein the insert comprises a throw-away type conventionally used in cutting off or grooving tools.

11. A cutter as set forth in claim 6 wherein the aperture comprises a slit opening at the intersection of the insert positioning surface and the clamping surface of the planar member and extending radially inwardly from the opening at an angle to the top surface of the planar member.

12. A cutter as set forth in claim 11 wherein the angle is on the order of eight degrees.

13. A cutter as set forth in claim 2 wherein the camming member has substantially the same thickness as the disc shaped body and is substantially permanently seated in the mating cavity for rotation therein by peening the first and second lateral surfaces around a periphery of the cavity.

14. A cutter as set forth in claim 1 wherein the actuating means includes at least one hexagonal cavity for receipt of a standard hexagonal wrench for imparting rotative motion thereto.

15. A cutter as set forth in claim 1 wherein the actuating means is operative to urge the clamping portion into engagement with the insert in either of two rotative directions about an axis of the actuating means.

16. In a slotting cutter having a disc shaped body, apparatus for positively locating and retaining a plurality of disposable cutting inserts conventionally used individually in non-rotating cut-off tools, each cutting insert presenting a cutting edge substantially parallel to an axis of rotation of the slotting cutter and each extending substantially the entire width of a slot to be cut, said apparatus comprising:
a plurality of substantially rectangular pockets spaced abouut the periphery of the cutter and extending axially completely through the cutter body, each pocket having a radially innermost rear surface connecting top and bottom pocket surfaces and an opening at the cutter body periphery shaped for slideable receipt of a rearward portion of a cutting insert, each pocket additionally housing a matingly shaped planar clamping blade having a first portion disposed between a rear surface of the cutting insert and the rear surface of the pocket and a second portion separated from the first portion by a sawcut extending from an opening in the blade abutting the rear surface of the insert and extending toward the rear surface of the pocket terminating at a flexible portion of the blade joining the first and second portions, the second portion abutting the top surface of the pocket and overhanging a top surface of the insert, and a substantially circular camming member having a flatted portion positioned is a mating cavity of the cutter body adjacent the pocket such that the flatted portion of the mating cavity is coextensive with a portion of the top surface of the pocket, the camming member operative in at least a first rotative position to urge the second portion into clamping engagement with the insert via flexing about the flexible portion.

* * * * *